United States Patent
Godana et al.

(10) Patent No.: US 9,478,887 B2
(45) Date of Patent: Oct. 25, 2016

(54) FLEXIBLE ELECTRICAL CONNECTOR INSERT WITH CONDUCTIVE AND NON-CONDUCTIVE ELASTOMERS

(71) Applicant: Quell Corporation, Albuquerque, NM (US)

(72) Inventors: Ken Godana, Albuquerque, NM (US); Dusty Erven, Albuquerque, NM (US); Kevin Foreman, Durango, CO (US); Paul Miller, Hesperus, CO (US)

(73) Assignee: Quell Corporation, Albuquerque, NM (US)

( * ) Notice: Subject to any disclaimer, the term of this patent is extended or adjusted under 35 U.S.C. 154(b) by 0 days.

(21) Appl. No.: 14/529,864

(22) Filed: Oct. 31, 2014

(65) Prior Publication Data

US 2015/0126051 A1     May 7, 2015

Related U.S. Application Data (60) Provisional application No. 61/898,927, filed on Nov. 1, 2013.

(51) Int. Cl.
| | |
|---|---|
| *H01R 12/00* | (2006.01) |
| *H01R 13/24* | (2006.01) |
| *H01G 4/002* | (2006.01) |
| *H01R 27/00* | (2006.01) |
| *H01R 43/00* | (2006.01) |
| *H01R 13/6588* | (2011.01) |
| *H01R 13/6599* | (2011.01) |
| *H01R 13/6464* | (2011.01) |
| *H01R 13/66* | (2006.01) |
| *H01R 107/00* | (2006.01) |

(52) U.S. Cl.
CPC ......... *H01R 13/2414* (2013.01); *H01G 4/002* (2013.01); *H01R 13/6588* (2013.01); *H01R 13/6599* (2013.01); *H01R 27/00* (2013.01); *H01R 43/00* (2013.01); *H01R 13/6464* (2013.01); *H01R 13/6625* (2013.01); *H01R 2107/00* (2013.01); *Y10T 29/49208* (2015.01)

(58) Field of Classification Search
CPC ...... H01R 13/24; H01R 27/00; H01R 43/00; H01R 13/2414
USPC ............ 439/66, 67, 69, 74, 88–91, 586–589
See application file for complete search history.

(56) References Cited

U.S. PATENT DOCUMENTS

| | | | | |
|---|---|---|---|---|
| 3,539,973 | A * | 11/1970 | Wright | H01R 13/7197 333/182 |
| 3,849,708 | A * | 11/1974 | Leighton | H01G 4/232 361/308.1 |
| 3,982,320 | A * | 9/1976 | Buchoff | G04G 17/06 29/883 |
| 4,003,621 | A |  1/1977 | Lamp | |

(Continued)

FOREIGN PATENT DOCUMENTS

| | | |
|---|---|---|
| EP | 0287349 A1 | 10/1988 |
| EP | 0643445 A2 | 3/1995 |

*Primary Examiner* — Chandrika Prasad
(74) *Attorney, Agent, or Firm* — Jeffrey D. Myers; Justin R. Muehlmeyer; Peacock Myers, P.C.

(57) ABSTRACT

A connector insert comprising a plurality of layers of conductive elastomer, and a concomitant method of employing a connector insert, the method comprising the steps of fabricating a plurality of layers of conductive elastomer as an insert and placing the insert into a connector.

15 Claims, 10 Drawing Sheets

(56) References Cited

U.S. PATENT DOCUMENTS

| | | | |
|---|---|---|---|
| 4,050,756 A * | 9/1977 | Moore | G04G 17/06 174/254 |
| 4,458,220 A | 7/1984 | Carter et al. | |
| 4,494,092 A | 1/1985 | Griffin | |
| 4,628,409 A * | 12/1986 | Thompson | H05K 1/115 228/180.1 |
| 4,867,706 A * | 9/1989 | Tang | H01R 13/7195 333/185 |
| 4,932,673 A | 6/1990 | Domnikov et al. | |
| 5,011,434 A | 4/1991 | Blunt | |
| 5,109,596 A * | 5/1992 | Driller | G01R 1/0735 29/705 |
| 5,181,859 A | 1/1993 | Foreman et al. | |
| 5,287,076 A | 2/1994 | Johnescu et al. | |
| 5,385,483 A * | 1/1995 | Lin | H01R 4/2495 439/421 |
| 5,415,569 A | 5/1995 | Colleran et al. | |
| 5,590,460 A | 1/1997 | DiStefano et al. | |
| 5,661,450 A | 8/1997 | Davidson | |
| 5,759,047 A * | 6/1998 | Brodsky | H01L 23/49811 439/66 |
| 5,984,691 A * | 11/1999 | Brodsky | H01L 23/49811 439/66 |
| 6,413,119 B1 | 7/2002 | Gabrisko, Jr. et al. | |
| 6,417,747 B1 * | 7/2002 | Dearden | H01L 23/66 333/247 |
| 6,465,084 B1 * | 10/2002 | Curcio | H05K 3/462 174/255 |
| 6,716,063 B1 | 4/2004 | Bryant et al. | |
| 6,808,422 B2 | 10/2004 | Chengalva | |
| 6,961,231 B1 | 11/2005 | Alexander et al. | |
| 7,249,971 B2 | 7/2007 | Burke et al. | |
| 7,614,142 B2 | 11/2009 | Shioga et al. | |
| 7,841,862 B2 * | 11/2010 | Hasegawa | H01L 21/486 174/137 R |
| D746,236 S * | 12/2015 | Horchler | D13/154 |
| 2003/0162287 A1 * | 8/2003 | Yamamoto | C12N 5/0075 435/289.1 |
| 2010/0044089 A1 | 2/2010 | Shibuya et al. | |

* cited by examiner

FIG. 6

FLEXIBLE ELECTRICAL CONNECTOR INSERT WITH CONDUCTIVE AND NON-CONDUCTIVE ELASTOMERS

CROSS-REFERENCE TO RELATED APPLICATIONS

This application claims priority to and the benefit of the filing of U.S. Provisional Patent Application Ser. No. 61/898,927, entitled "Very Low Inductance Design for Electrical Connector Insert", filed on Nov. 1, 2013, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to inserts installed into an existing or new electrical connector to reliably add electrical circuitry to the system and concomitant methods of use and construction.

2. Description of Related Art

The present invention primarily relates to an insert installed into an existing or new electrical connector to reliably add electrical circuitry to the system. Current technology in this field uses either standard circuit board technology or EESeal® silicone inserts. The circuit board technology corrupts the existing environmental seal of the connector, and so is unsuitable for high-reliability connectors. The EESeal technology is made primarily from silicone elastomer, and so does not corrupt the existing seal. However, the filament wire interconnects within the insert introduce unwanted stray inductance and are labor intensive to construct. The additional stray inductance limits EESeal effectiveness at frequencies above 100 MHz. Both technologies incorporate discrete surface mount devices, primarily capacitors, whose stray inductance is typically a minimum of 0.5 nH. The stray inductance of the surface mount devices also limits high frequency performance.

BRIEF SUMMARY OF THE INVENTION

The present invention is of a connector insert comprising one or more layers of conductive elastomer. Preferably, the layers have a volume resistivity less than about 0.010 ohms/cm. The insert can be placeable into an existing connector. The layers have holes for pins of the connector, and provide at least a connector shell contact, a ground plane, and a pin contact. The connector insert can additionally comprise a capacitor, preferably comprising a plurality of layers of conductive elastomer, with separation provided by at least one layer of non-conductive material, and most preferably wherein the at least one layer of non-conductive material comprises non-conductive elastomer. The insert may additionally comprise one or more other electrical components such as resistors, MOVs, diodes, fuses, anti-fuses, shorting blocks, inductors, active electrical components, and any combination thereof, and one or more electrical components may comprise elastomer.

The invention is additionally of a concomitant method of employing a connector insert, the method comprising the steps of: fabricating one or more layers of conductive elastomer as an insert; and placing the insert into a connector. The layers preferably have a volume resistivity less than about 0.010 ohms/cm. The connector may be an existing connector. Holes are formed in the insert for the pins of the connector, and the insert provides at least a connector shell contact, a ground plane, and a pin contact for the connector. A capacitor may be formed in the insert, preferably wherein the capacitor comprises a plurality of layers of conductive elastomer, with separation provided by at least one layer of non-conductive material, and most preferably wherein the at least one layer of non-conductive material comprises non-conductive elastomer. One or more electrical components may be formed in the insert, and one or more of the electrical components may comprise elastomer.

The invention is further of a capacitor for a connector insert, the capacitor comprising a plurality of layers of elastomer, with separation provided by at least one layer of non-conductive material.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention employs planar conductive layers rather than the wire interconnects within a connector insert, which provides a number of advantages. The conductive layers can be conductive elastomer or other conductive element(s) such as a thin metal sheet, but the preferred construct is conductive silicone elastomer, with a volume resistivity preferably less than about 0.010 ohms/cm. Electrically opposing conductive layers are insulated from each other by the non-conductive elastomer. An electrical component, such as a 0402 SMD sized capacitor, transient voltage suppressor, or resistor, is connected between the two conductive layers. This planar arrangement of the conductors greatly reduces unwanted stray inductance. Further, a small capacitor can be formed by overlapping the opposing conductors and separating them with a thin layer of non-conductive elastomer, or other non-conductive material with high dielectric constant, such as polypropylene. A relative permittivity greater than 2 is preferred for any of these non-conductive layers. The planar construction of this integrated capacitor, and the elimination of a discrete capacitor, yields ultra-low stray inductance, providing effective filtering well into the GHz frequencies. An insert can employ a discrete device and/or an integral capacitor to achieve a parallel configuration, with the discrete device providing filtering at lower frequencies and the integral capacitor taking over at higher frequencies.

In addition to being installed at the mating interface of a connector pair in a retrofit manner, this assembly can be built into a single connector half, creating a filtered connector. Two capacitive inserts, separated by an inductive element, can be built into a connector, thereby creating a Pi filter. A "T" or "L" type filter can be similarly configured.

This type of electronic circuit construction, utilizing flexible conductive elastomer interconnections between circuit elements and external electrical contacts, has application in fields other than electrical connectors, such as medical and consumer electronics where the circuitry is required to be compressed or flexed.

Figure 1:
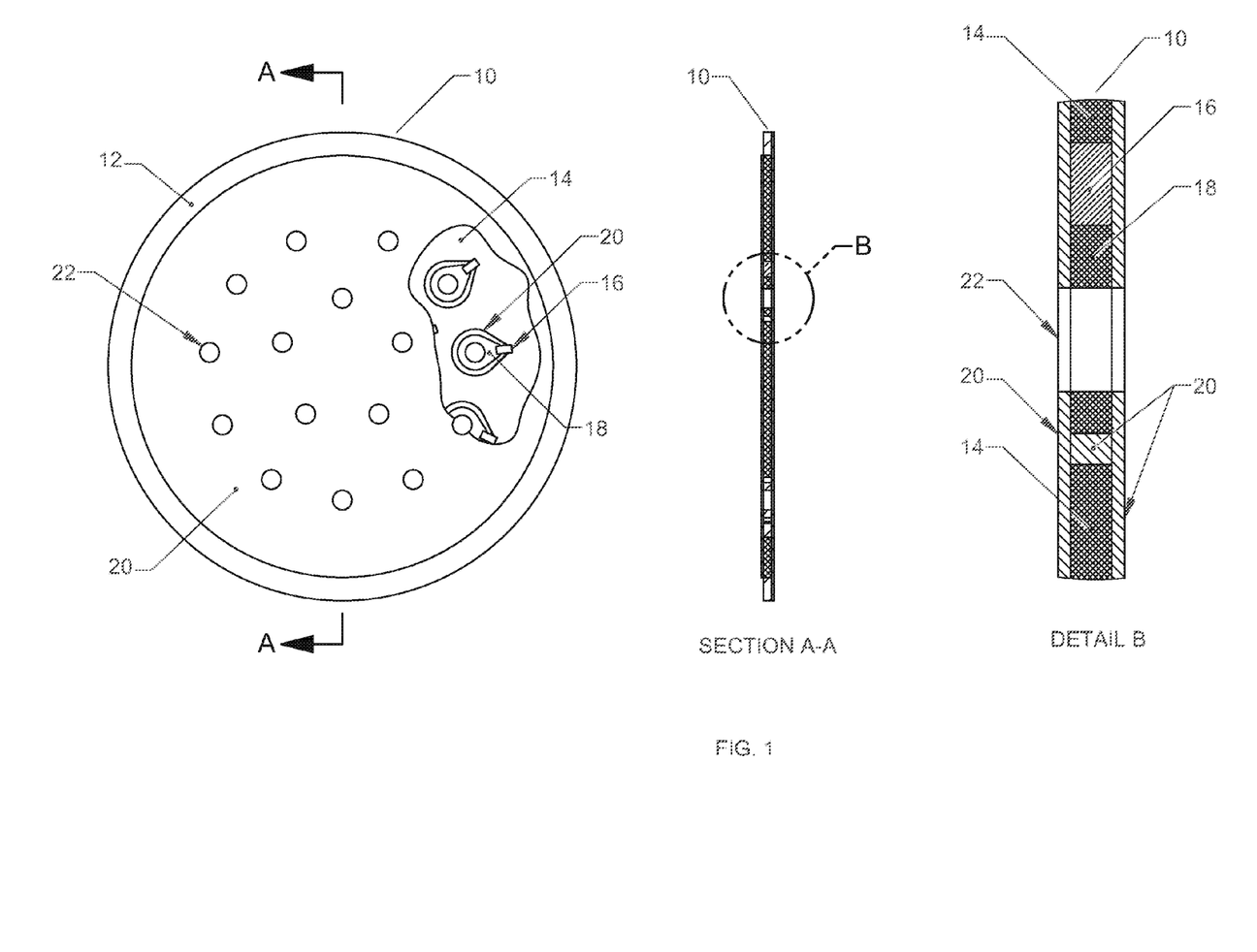
FIG. 1 is a schematic diagram of a discrete component connector insert with planar conductive elastomer construction according to the invention.

Turning to the figures, FIG. 1 shows one possible construction of a discrete component connector insert 10 with planar conductive elastomer layers, comprising conductive elastomer shell contact 12, conductive elastomer ground plane 14, electrical components 16, conductive elastomer pin contact 18, non-conductive elastomer 20, and pin holes 22. In this embodiment, electrical components 16 comprise discrete capacitors. This insert would typically be installed over the pins of a high reliability circular connector to provide EMI filtering. In other embodiments, electrical components 16 may comprise resistors, MOVs, diodes, fuses, antifuses, shorting blocks, inductors, active electrical components, and any combination thereof.

Contact to at least one pin of the existing connector is made using a layer of conductive elastomer 18 with a hole 22 therein. The diameter of the hole 22 is preferably smaller than the diameter of the pin of the existing connector, so that when the pin is inserted into hole 22, the conductive elastomer stretches to accommodate the pin. This stretching of the conductive elastomer results in a tight fit around the pin, and electrical contact from the pin to the conductive elastomer is thereby achieved. One end of an electrical component 16, e.g., a 0402 SMD capacitor, is placed so that it makes contact to the conductive elastomer pin contact 18. The other end of the electrical component 16 makes contact with the planar conductive elastomer ground plane 14. The pin contact and the ground plane are separated from each other with a layer of non-conductive elastomer 20 placed between them. Non-conductive elastomer 20 is used to encapsulate the top and bottom of the connector insert 10. The conductive elastomer shell contact 12 is exposed around the periphery of the insert 10 and along the top surface periphery. Its outside diameter is slightly larger than the inside diameter of the existing connector shell so that it is compressed when installed, achieving electrical contact with the existing connector shell. It can also make contact to the existing mating connector shell along the top surface periphery. The resulting planar construction of the insert 10 results in a very low stray inductance, and much better filtering performance, as compared to existing technology.

Figure 2:
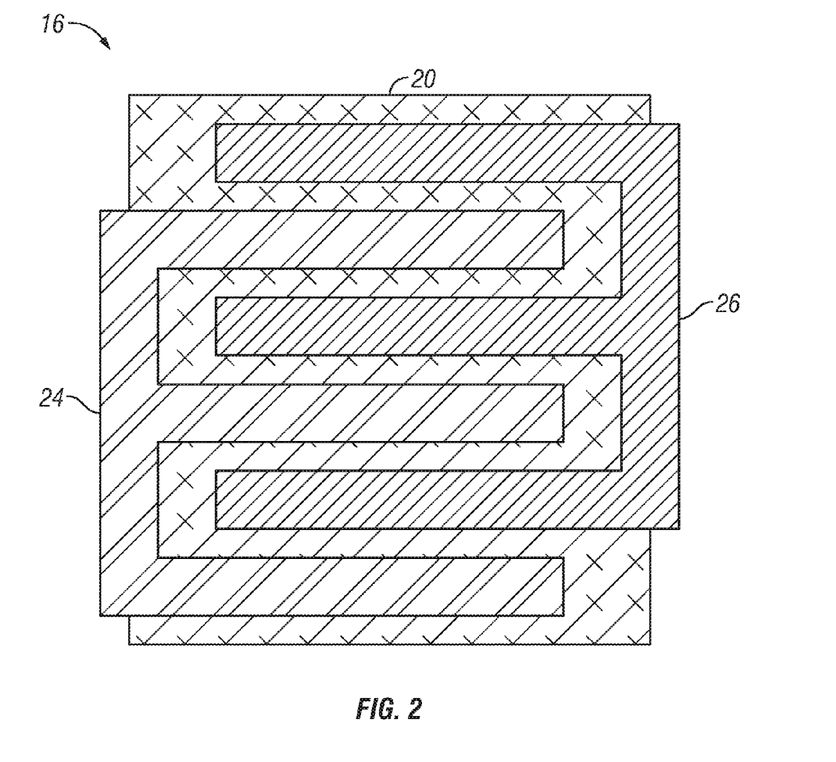
FIG. 2 is a schematic diagram of a conductive elastomer capacitor according to the invention.

FIG. 2 shows an example of an integral capacitor 17 created using conductive elastomer and non-conductive elastomer, comprising dielectric non-conductive elastomer 21, conductive elastomer first terminal 24, and conductive elastomer second terminal 26. A capacitor comprises a plurality of conductive plates separated by an insulating material. The value of the capacitor is determined by the overlapping surface area of the plates, the distance between the plates, and the dielectric constant of the insulating material.

By using elastomers for both the conductive and insulating components of a capacitor, the resulting part can change shape through compression, distension, flexure and other external forces while maintaining its electrical performance and mechanical integrity.

Figure 3:
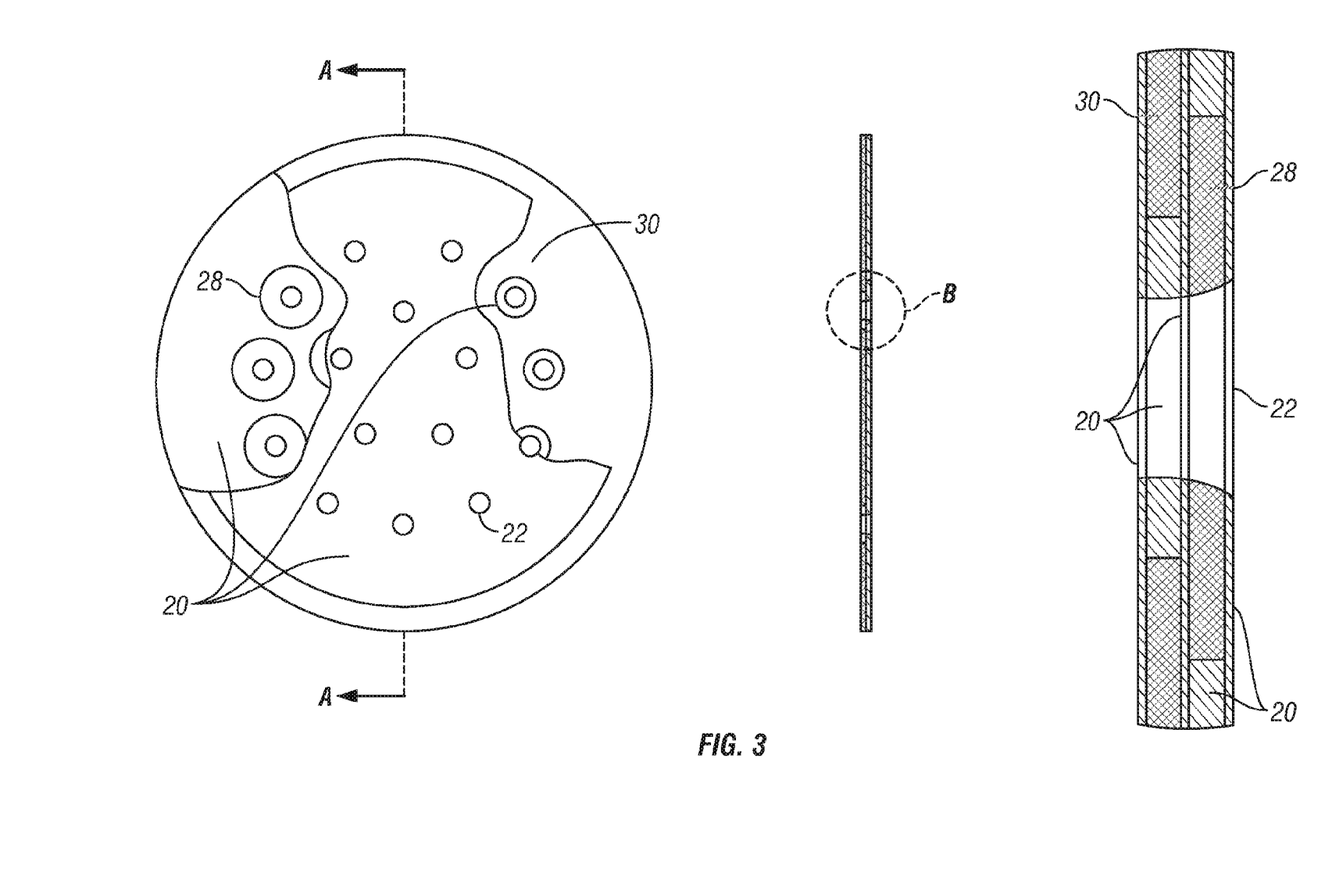
FIG. 3 is a schematic diagram of a conductive elastomer capacitor integrated into a connector insert according to the invention.

This type of capacitor can be created as an integral part of the fabrication of a connector insert (integral capacitor 17) as shown in FIG. 3, comprising conductive elastomer shell contact 12, non-conductive elastomer 20, dielectric non-conductive elastomer 21, pin holes 22, conductive elastomer pin contact plate 28, and conductive elastomer ground plate plane 30. In this example, the conductive elastomer pin contact plate is positioned above-below the conductive elastomer ground plate and separated by a thin layer of dielectric non-conductive elastomer. Non-conductive elastomer 20 is used to isolate the conductive elastomer ground plate 30 from the at least one pin of the existing connector. The overlapping area of the two conductive elastomers, thickness of the dielectric non-conductive elastomer layer, and the dielectric constant of the dielectric non-conductive elastomer determine the value of the resulting capacitor. Non-conductive elastomer 20 is used to encapsulate the top and bottom of the connector insert 10. The conductive elastomer shell contact 12 is exposed around the periphery of the insert 10 and along the top surface periphery. Its outside diameter is slightly larger than the inside diameter of the existing connector shell so that it is compressed when installed, achieving electrical contact with the existing connector shell. It can also make contact to the existing mating connector shell along the top surface periphery. Since no discrete device is used, the resulting filter is extremely low inductance and provides effective filtering well into the 10's of GHZ.

Figure 4:
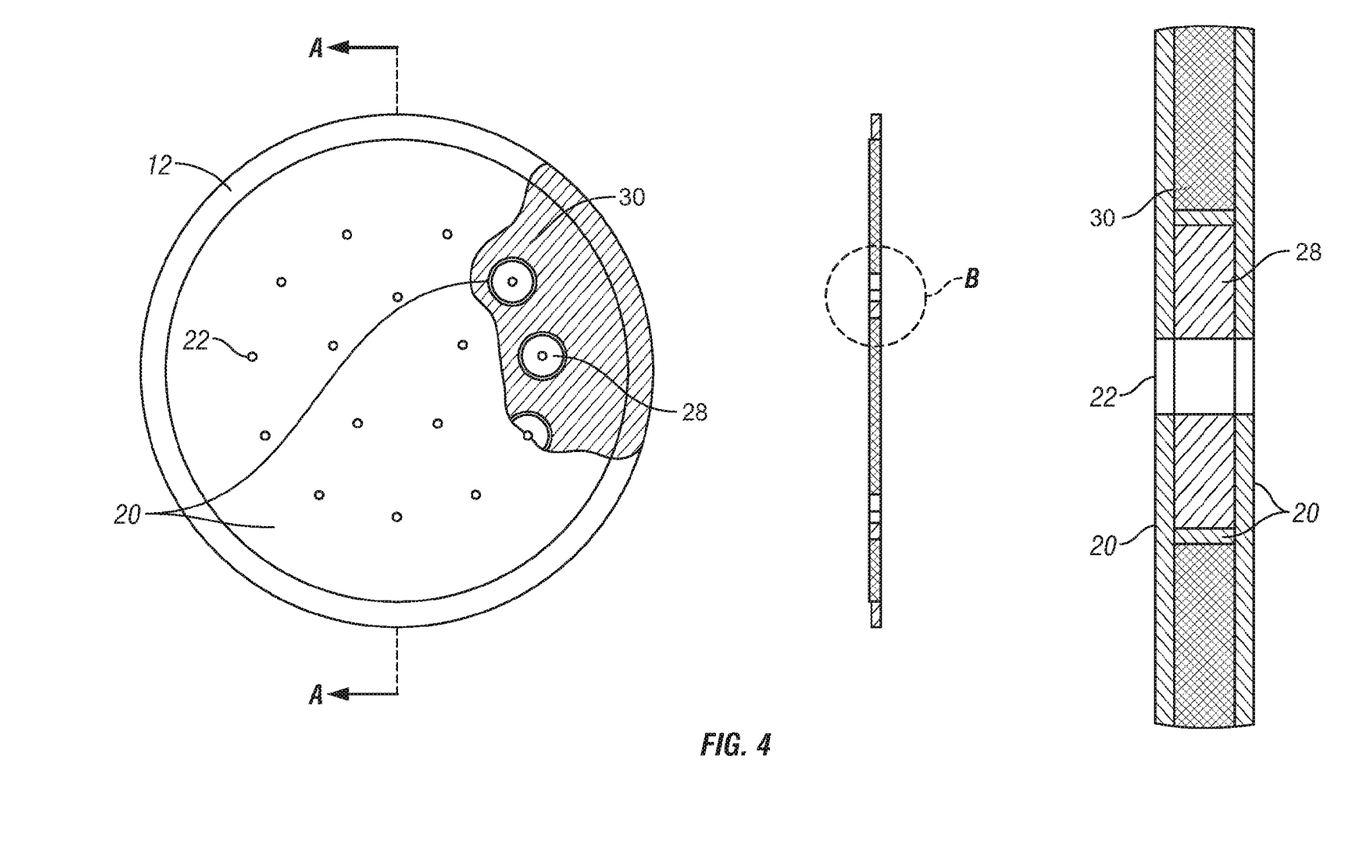
FIG. 4 is a schematic diagram of a conductive elastomer "perimeter" capacitor integrated into a connector insert according to the invention.

Instead of using overlapping layers, an integral capacitor 17 can also be created using the perimeter of the conductive elastomer pin contact as one plate, the surface of the conductive elastomer ground plane around the pin contact as the other plate, and the gap between these surfaces filled with a dielectric non-conductive elastomer as the dielectric layer as shown in FIG. 4. This embodiment comprises conductive elastomer shell contact 12, conductive elastomer ground plate 30, conductive elastomer pin contact plate 28, dielectric non-conductive elastomer 21, non-conductive elastomer 20, and pin holes 22. The perimeter of the conductive elastomer pin contact plate can be any shape, but the preferred shape is a circle. The surface area of the perimeter of the conductive elastomer pin contact plate, the thickness of the gap filled with the dielectric non-conductive elastomer and the dielectric constant of the dielectric non-conductive elastomer determine the value of the resulting capacitor. Non-conductive elastomer 20 is used to encapsulate the top and bottom of the connector insert 10. The conductive elastomer shell contact 12 is exposed around the periphery of the insert 10 and along the top surface periphery. Its outside diameter is slightly larger than the inside diameter of the existing connector shell so that it is compressed when installed, achieving electrical contact with the existing connector shell. It can also make contact to the existing mating connector shell along the top surface periphery. Since no discrete device is used, the resulting filter is extremely low inductance and provides effective filtering well into the 10's of GHZ.

Figure 5:
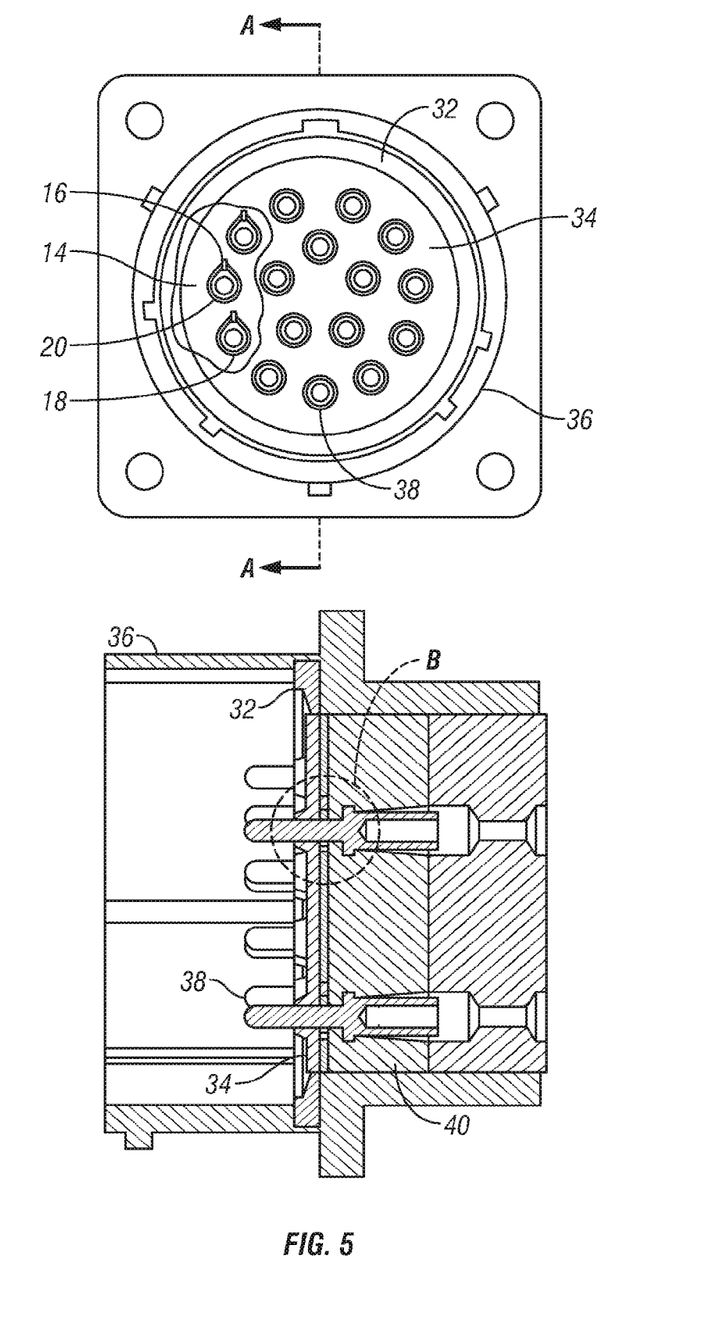
FIG. 5 is a schematic diagram of a discrete component connector insert with planar conductive elastomer construction integrated into a connector assembly according to the invention.

With minor dimensional modifications, the embodiments described above can also be made an integral part of a connector as shown in FIG. 5, instead of an insert between a connector pair. This embodiment comprises conductive elastomer ground plane 14, capacitor 16, conductive elastomer pin contact 18, non-conductive elastomer 20, o-ring 32, interfacial seal 34, connector shell 36, pins 38, and connector insert 40. One example involves placing the embodiment between the connector insert and the interfacial seal. This permits the necessary contact with the pins and the connector shell while preserving the mating and sealing features of a standard connector pair. With further modifications to a standard connector, the embodiment can be installed elsewhere within the connector as well.

Figure 6:
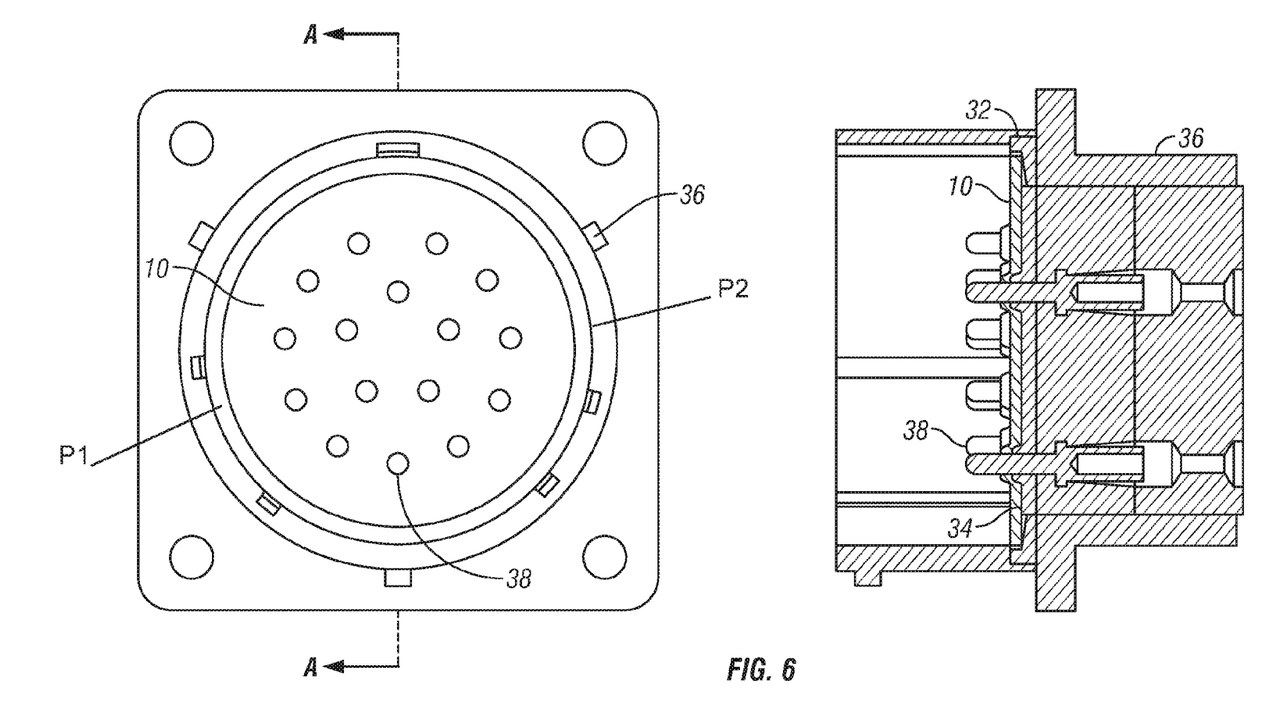
FIG. 6 is a schematic diagram of an insert according to the invention placed into a pre-existing connector (retrofit)

FIG. 6 illustrates placement of an insert 10 according to the invention into a pre-existing connector, thereby providing a retrofit improvement to the connector. Insert 10 is shown comprising outside perimeter P1 as installed over pins 38 and as oriented with respect to interfacial seal 34, o-ring 32, and connector shell 36 with cavity having inside perimeter P2.

Note that in the specification and claims, "about" or "approximately" means within twenty percent (20%) of the numerical amount cited.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

Figure 7:
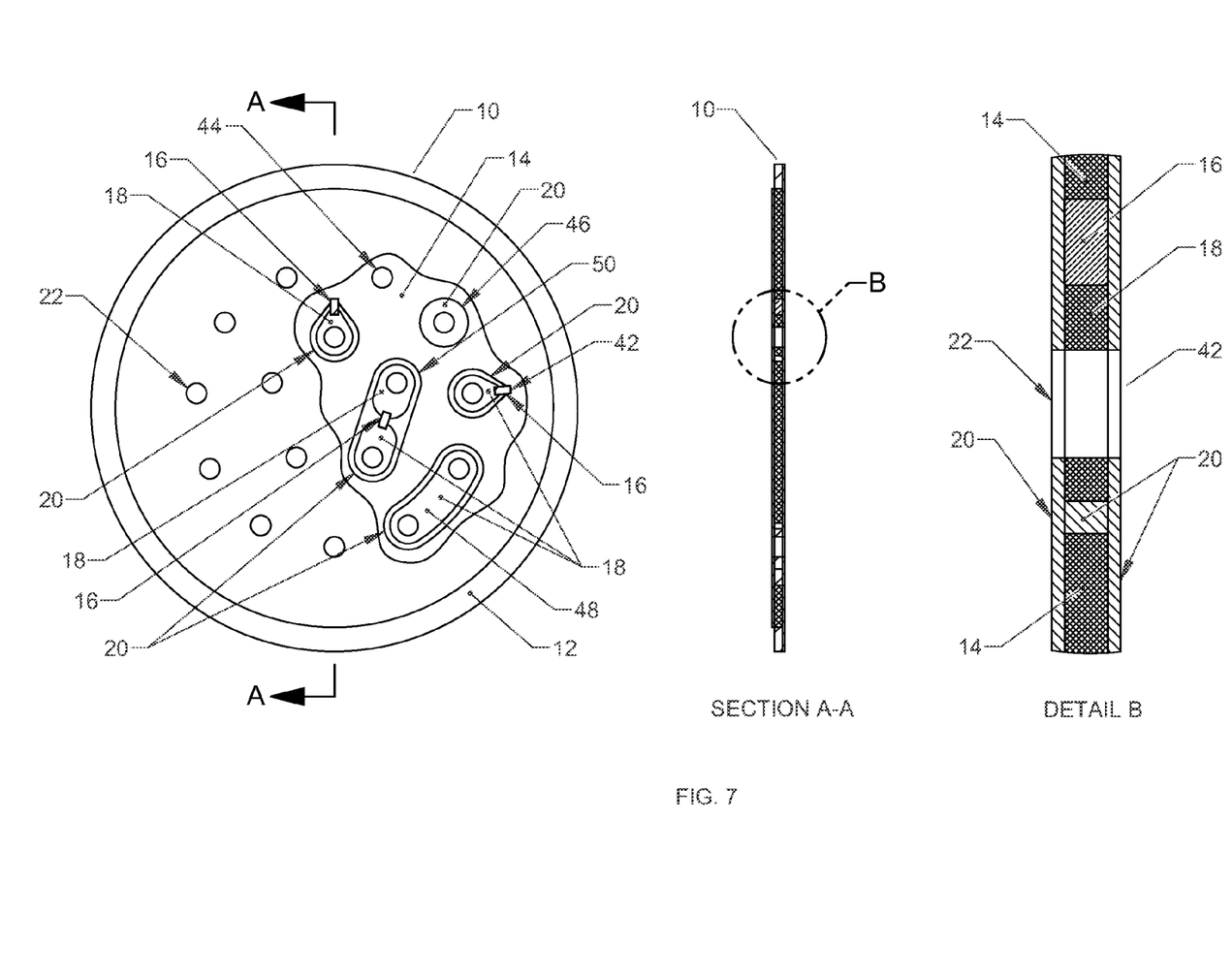
FIG. 7 is a schematic diagram with cut-through views and a cross sectional view of a discrete component connector insert with planar conductive elastomer construction according to the invention illustrating variations on the use of electrical components.

FIG. 7 shows another embodiment of a discrete component connector insert 10 with planar conductive elastomer layers, comprising conductive elastomer shell contact 12, conductive elastomer ground plane 14, conductive elastomer pin contact 18, electrical components 16, non-conductive elastomer 20, and pin holes 22. Pin-to-shell discrete component 42 is shown wherein one end of an electrical component 16, e.g., a 0402 SMD capacitor, is placed so that it makes contact to the conductive elastomer pin contact 18. The other end of the electrical component 16 makes contact with the conductive elastomer ground plane 14. The conductive elastomer pin contact and the conductive elastomer ground plane are separated from each other with a layer of non-conductive elastomer 20 placed between them. Shorted pin 44 is shown wherein at least one pin hole 22 is created in the conductive elastomer ground plane 14 to provide an electrical connection between at least one pin of an existing connector and the existing connector shell. Open pin 46 is shown wherein at least one pin hole 22 is created in non-conductive elastomer 20 to provide electrical isolation between at least one pin of an existing connector and the existing connector shell. Pin-to-pin short 48 is shown wherein at least two pins holes 22 are created in a continuous conductive elastomer pin contact 18 to provide an electrical connection between at least two pins of the existing connector. Non-conductive elastomer 20 is used to electrically isolate the conductive elastomer pin contact 18 from the conductive elastomer ground plane 14. Pin-to-pin discrete component 50 is shown wherein non-conductive elastomer 20 is used to electrically isolate two conductive elastomer pin contacts 18 from each other and from the conductive elastomer ground plane 14. One end of an electrical component 16 is placed so that it makes contact to one of the conductive elastomer pin contacts 18. The other end of the electrical component 16 makes contact with the other conductive elastomer pin contact 18. Non-conductive elastomer 20 is used to encapsulate the top and bottom of the connector insert 10. The conductive elastomer shell contact 12 is exposed around the periphery of the insert 10 and along the top surface periphery. Its outside diameter is slightly larger than the inside diameter of the existing connector shell so that it is compressed when installed, achieving electrical contact with the existing connector shell. It can also make contact to the existing mating connector shell along the top surface periphery.

Figure 8:
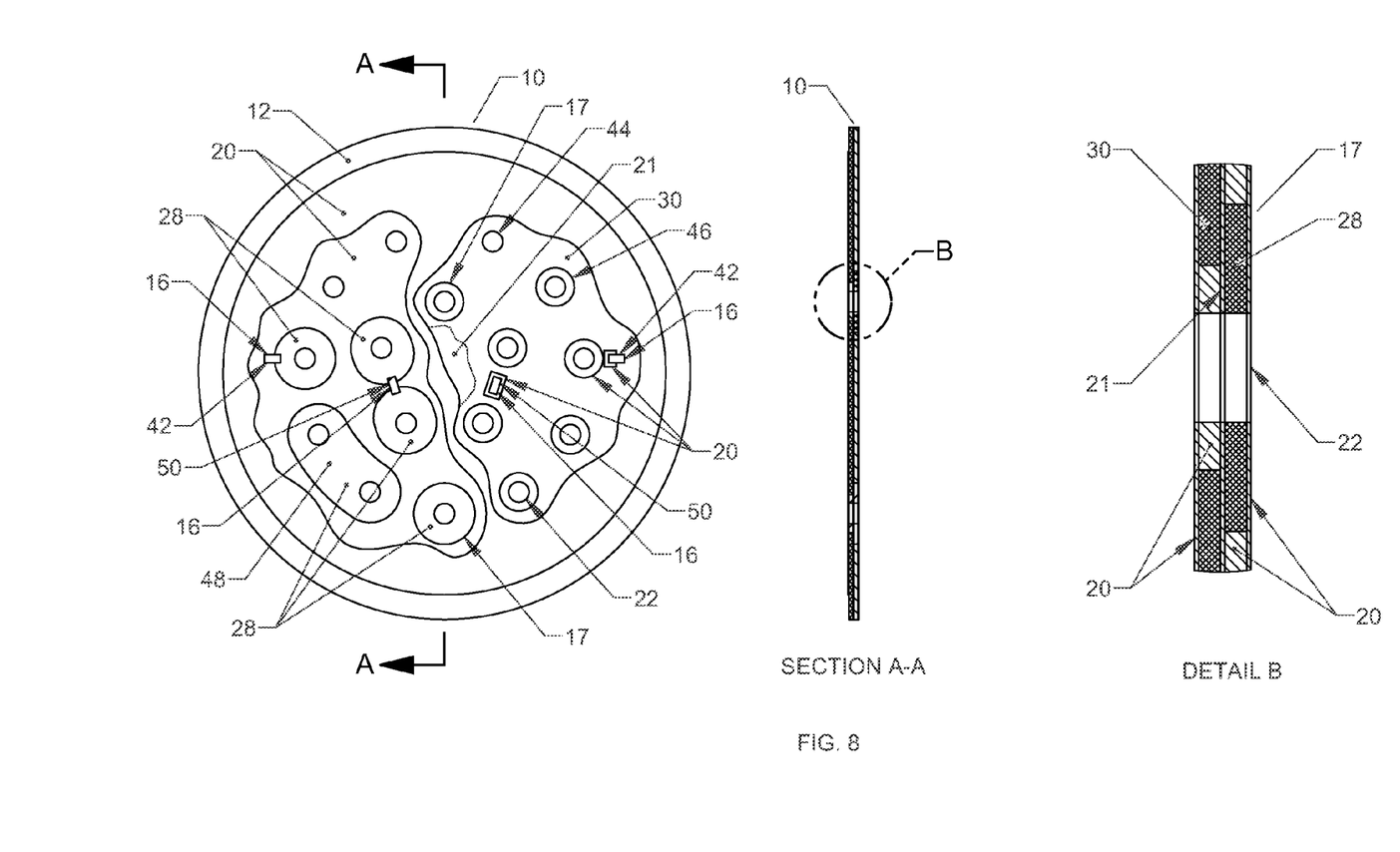
FIG. 8 is a schematic diagram with cut-through views and a cross sectional view of a conductive elastomer capacitor integrated into a connector insert according to the invention illustrating variations on the use of electrical components.

FIG. 8 shows another embodiment of an integral capacitor insert comprising non-conductive elastomer 20, dielectric layer 21, conductive elastomer pin contact plate 28, conductive elastomer ground plate 30, and various uses of electrical components 16. Pin-to-shell discrete component 42 is shown wherein, in addition to the integral capacitor 17 described in FIG. 3, one end of an electrical component 16, e.g., a 0402 SMD capacitor, is placed so that it makes contact to the conductive elastomer pin contact plate 28. Non-conductive elastomer 20 is used to isolate this end of the electrical component from the conductive elastomer ground plate 30. The other end of the electrical component 16 makes contact with the conductive elastomer ground plate 30. The conductive elastomer pin contact plate and the conductive elastomer ground plate are separated from each other with a layer of dielectric non-conductive elastomer 21 placed between them. Shorted pin 44 is shown wherein at least one pin hole 22 is created in the conductive elastomer ground plate 30 to provide an electrical connection between at least one pin of an existing connector and the existing connector shell. Open pin 46 is shown wherein at least one pin hole 22 is created in non-conductive elastomer 20 to provide electrical isolation between at least one pin of an existing connector and the existing connector shell. Non-conductive elastomer 20 is used to electrically isolate the conductive elastomer ground plate 30 from the at least one pin of the existing connector. Pin-to-pin short 48 is shown wherein at least two pins holes 22 are created in a continuous conductive elastomer pin contact plate 28 to provide an electrical connection between at least two pins of the existing connector. Non-conductive elastomer 20 is used to electrically isolate the conductive elastomer ground plate 30 from the at least two pins of the existing connector. Pin-to-pin discrete component 50 is shown wherein, in addition to the integral capacitor 17 described in FIG. 3, non-conductive elastomer 20 is used to electrically isolate two conductive elastomer pin contact plates 28 from each other. One end of an electrical component 16 is placed so that it makes contact to one of the conductive elastomer pin contact plates 28. The other end of the electrical component 16 makes contact with other conductive elastomer pin contact plate 28. Non-conductive elastomer 20 is used to isolate the electrical component from the conductive elastomer ground plate 30. Non-conductive elastomer 20 is used to encapsulate the top and bottom of the connector insert 10. The conductive elastomer shell contact 12 is exposed around the periphery of the insert 10 and along the top surface periphery. Its outside diameter is slightly larger than the inside diameter of the existing connector shell so that it is compressed when installed, achieving electrical contact with the existing connector shell. It can also make contact to the existing mating connector shell along the top surface periphery.

Figure 9:
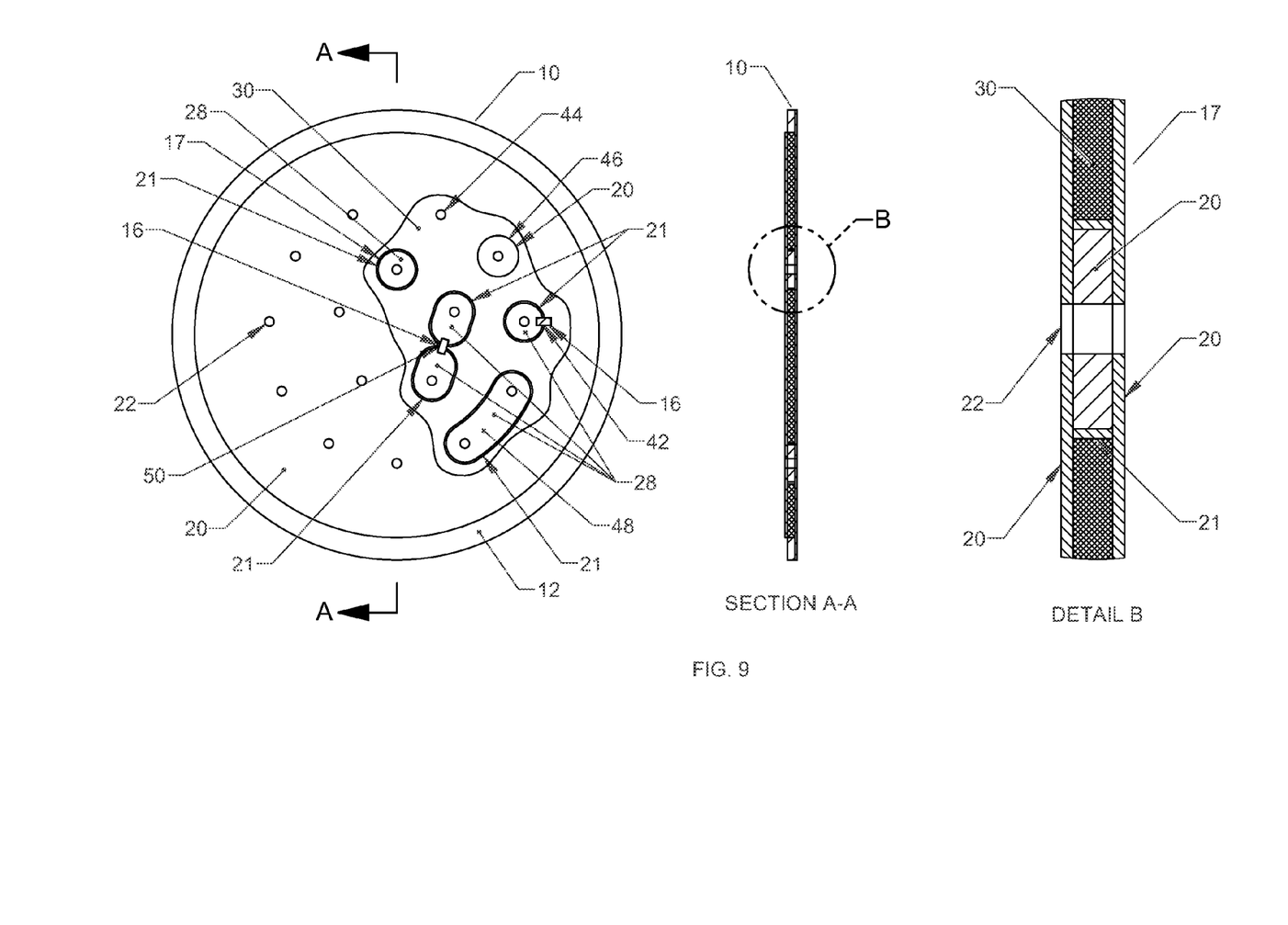
FIG. 9 is a schematic diagram with cut-through views and a cross sectional view of a conductive elastomer "perimeter" capacitor integrated into a connector insert according to the invention illustrating variations on the use of electrical components.

FIG. 9 shows another embodiment of an integral capacitor insert created using the perimeter of the conductive elastomer pin contact 28 as one plate, the surface of the conductive elastomer ground plane 30 around the pin contact 28 as the other plate, and the gap between these surfaces filled with the dielectric material 21. Various uses of components 16 are illustrated. Pin-to-shell discrete component 42 is shown wherein, in addition to the integral capacitor 17 described in FIG. 4, one end of an electrical component 16, e.g., a 0402 SMD capacitor, is placed so that it makes contact to the conductive elastomer pin contact plate 28. The other end of the electrical component 16 makes contact with the conductive elastomer ground plate 30. The conductive elastomer pin contact plate and the conductive elastomer ground plate are separated from each other with a layer of dielectric non-conductive elastomer 21 placed between them. Shorted pin 44 is shown wherein at least one pin hole 22 is created in the conductive elastomer ground plate 30 to provide an electrical connection between at least one pin of an existing connector and the existing connector shell. Open pin 46 is shown wherein at least one pin hole 22 is created in non-conductive elastomer 20 to provide electrical isolation between at least one pin of an existing connector and the existing connector shell. Pin-to-pin short 48 is shown wherein at least two pins holes 22 are created in a continuous conductive elastomer pin contact plate 28 to provide an electrical connection between at least two pins of the existing connector. Dielectric non-conductive elastomer 21 is used to electrically isolate the conductive elastomer pin contact plate 28 from the conductive elastomer ground plate 30. Pin-to-pin discrete component 50 is shown wherein dielectric non-conductive elastomer 21 is used to electrically isolate two conductive elastomer pin contact plates 28 from each other and from the conductive elastomer ground plate 30. One end of an electrical component 16 is placed so that it makes contact to one of the conductive elastomer pin contact plates 28. The other end of the electrical component 16 makes contact with another conductive elastomer pin contact plate 28. Non-conductive elastomer 20 is used to encapsulate the top and bottom of the connector insert 10. The conductive elastomer shell contact 12 is exposed around the periphery of the insert 10 and along the top surface periphery. Its outside diameter is slightly larger than the inside diameter of the existing connector shell so that it is compressed when installed, achieving electrical contact with the existing connector shell. It can also make contact to the existing mating connector shell along the top surface periphery.

What is claimed is:

1. A flexible unitary connector insert for adding circuitry within a shell and around at least one pin of an existing connector or mating pair of connectors, said connector insert comprising one or more layers of flexible and compressible conductive and non-conductive elastomers that provide all electrical connections and paths throughout said insert and all electrical insulation and isolation throughout said insert, the one or more layers of conductive and non-conductive elastomer comprising an outside perimeter to fit inside an inside perimeter of a cavity of the shell, and at least one opening for fitting around the at least one pin.

2. The connector insert of claim 1 wherein said conductive elastomer creates a ground plane to make an electrical connection between embedded electrical components and/or from one or more of said embedded electrical components to the shell and wherein said ground plane comprises an outside perimeter larger than the inside perimeter of the cavity of the shell when the connector insert is not in contact with the shell, but which compresses to comprise an outside perimeter equal to the inside perimeter of the shell when the connector insert is fit into the shell, wherein the connector insert maintains continuous mechanical and electrical contact around the inside perimeter of the shell.

3. The connector insert of claim 1 wherein the at least one opening of said conductive elastomer comprises a perimeter smaller than the perimeter of the at least one pin when the connector insert is not in contact with the pin, but which expands to comprise a perimeter equal to the perimeter of the pin when the connector insert is fit to the pin, wherein the connector insert maintains mechanical and electrical contact around the perimeter of the pin, said conductive elastomer makes an electrical connection between the pin and at least one other pin and/or embedded electrical components and/or the connector shell, and said conductive elastomer may conduct current between two or more pins.

4. The connector insert of claim 1 wherein the at least one opening of said non-conductive elastomer comprises a perimeter smaller than the perimeter of the at least one pin when the connector insert is not in contact with the pin, but which expands to comprise a perimeter equal to the perimeter of the pin when the connector insert is fit to the pin, wherein the connector insert maintains mechanical contact and electrical insulation around the perimeter of the pin.

5. The connector insert of any one of claims 1, 2, 3 and 4 additionally comprising a capacitor.

6. The connector insert of claim 5 wherein said capacitor comprises a plurality of layers of conductive elastomer with separation provided by at least one layer of non-conductive material.

7. The connector insert of claim 6 wherein said non-conductive material comprises flexible, non-conductive elastomer.

8. The connector insert of claim 7 wherein said non-conductive elastomer of said capacitor has a dielectric constant greater than 1.

9. The connector insert of claim 8 wherein said non-conductive elastomer of said capacitor has a dielectric constant greater than 10.

10. The connector insert of claim 1 placeable at an interface of a mating pair of existing connectors such that an environmental seal is created thereby preventing the passage of dust, fluids, gasses, or other contaminants through the connection.

11. The connector insert of claim 1 placeable internal to an existing connector such that an interface between the existing connector and an existing mating connector is not altered.

12. The connector insert of claim 5 wherein said capacitor comprises a plurality of coplanar segments of conductive elastomer separated by at least one thin strip of non-conductive material.

13. The connector insert of claim 12 wherein said non-conductive material comprises flexible, non-conductive elastomer.

14. The connector insert of claim 13 wherein said non-conductive elastomer of said capacitor has a dielectric constant greater than 1.

15. The connector insert of claim 14 wherein said non-conductive elastomer of said capacitor has a dielectric constant greater than 10.

* * * * *